United States Patent [19]
Deschatrettes et al.

[11] 4,428,163
[45] Jan. 31, 1984

[54] SHAPING MACHINE

[75] Inventors: Gerard Deschatrettes, Guecellard; Rene Tirel, Pont de Gennes, both of France

[73] Assignee: Glaenzer Spicer, Poissy, France

[21] Appl. No.: 300,980

[22] Filed: Sep. 9, 1981

[30] Foreign Application Priority Data

Sep. 29, 1980 [FR] France .................... 80 20807

[51] Int. Cl.³ .............................................. B25B 5/00
[52] U.S. Cl. ............................ 51/237 M; 51/101 LG
[58] Field of Search ............. 51/101 R, 101 LG, 236, 51/237 R, 237 M

[56] References Cited

U.S. PATENT DOCUMENTS

B 391,437  1/1975  Pedersen ................. 51/237 R

FOREIGN PATENT DOCUMENTS 220075  9/1908  Fed. Rep. of Germany .

Primary Examiner—E. R. Kazenske
Assistant Examiner—Douglas D. Watts
Attorney, Agent, or Firm—Wenderoth, Lind & Ponack

[57] ABSTRACT

The or each workpiece carrying plate is connected to a rotary spindle by three elastically yieldable struts which are arranged around the axis of rotation of the spindle. The plate carries a peripheral cam which is engaged by a roller carried by an elastically yieldable strip. Application is to the center-less grinding of trunnions of tripod elements for homokinetic joints.

8 Claims, 5 Drawing Figures

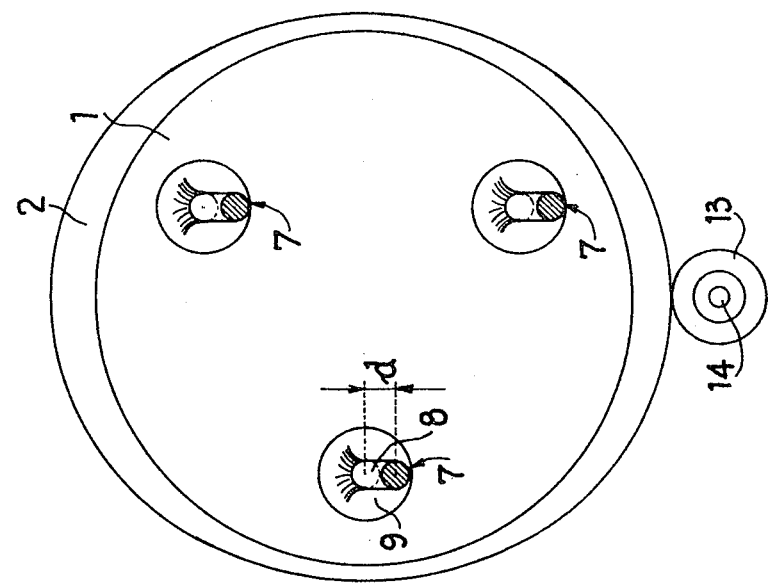
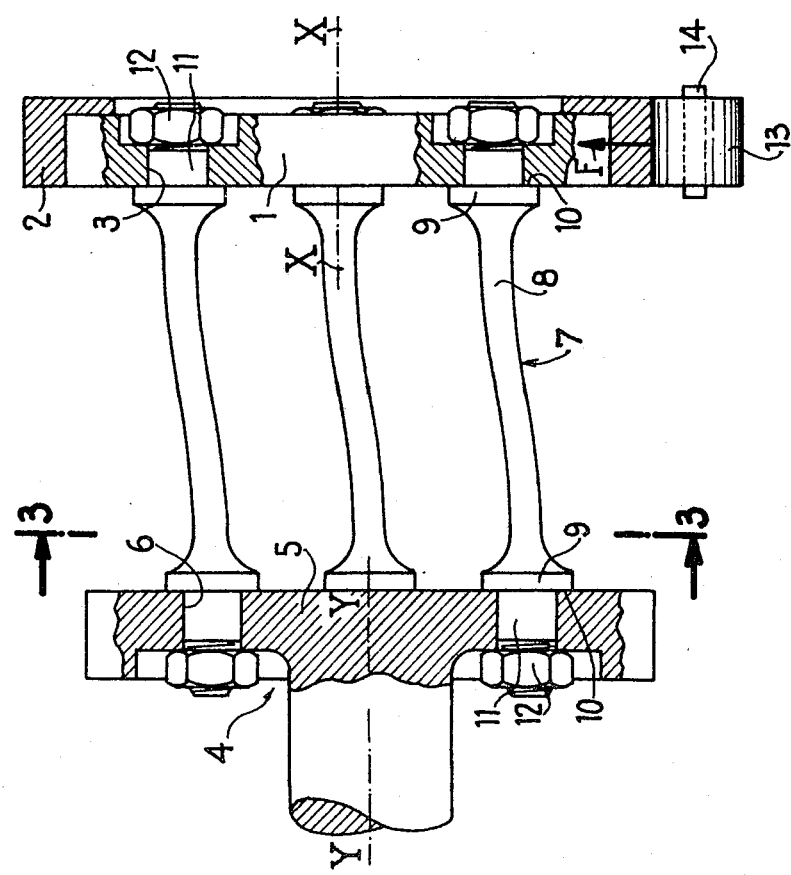

SHAPING MACHINE

BACKGROUND OF THE INVENTION

The present invention relates to shaping machines and in particular grinding machines. It is more particularly applicable to machines for grinding the trunnions of tripod elements for homokinetic joints.

It is known that certain component parts must have ground surfaces the profile of which differs from the circular shape. This is in particular the case of the trunnions of tripod elements whose profile remains very close to the circular shape (see French patent No. 1 380 557). The precisely controlled alteration from the circularity of the trunnions enables the torque transmitting capacity of the joint to be doubled by an equal circular distribution of the forces exerted on the needles employed in these joints.

In order to obtain such profiles with precision, it has been proposed (see French patent No. 1 401 983) to connect the workpiece carrying plate to a driving rotary spindle by elastically yieldable connecting means. However, the elastically yieldable means provided in this patent, which are formed by a beam or strut which is coaxial to the plate, do not in themselves provide a perfectly radial displacement of the plate.

SUMMARY OF THE INVENTION

An object of the present invention is to improve these connecting means so that they ensure a radial displacement of the workpiece-carrying plate in a direction exactly parallel to itself in the course of its rotation so as to precisely shape the workpiece which are fixed in an eccentric position on such plate.

The present invention provides a shaping machine of the type comprising a rotary spindle driven by a motor, a workpiece-carrying plate perpendicular to the axis of the spindle, radially elastically yieldable connecting means between the plate and the spindle, means for radially biasing the plate in the course of the rotation thereof, and means for maintaining a workpiece to be shaped in a position coaxial to the plate, wherein the elastically yieldable connecting means comprise a series of radially elastically yieldable struts which are parallel to the axis and are arranged about the axis.

Preferably, each strut has, in the body part thereof a substantially constant diameter, and, adjacent each end, an enlarged portion which forms a shoulder and is extended by a screwthreaded axial rod whose diameter is between the diameter of the body portion of the strut and the diameter of the shoulder.

BRIEF DESCRIPTION OF THE DRAWINGS

Further features and advantages of the invention will be apparent from the ensuing description which is given merely by way of example with reference to the accompanying drawings in which:

FIG. 2 is a corresponding view in longitudinal section after rotation of the plate thrugh a quarter of a rotation;

FIG. 3 is a sectional view taken along line 3—3 of FIG. 2;

DETAILED DESCRIPTION OF THE INVENTION

Figure 1:
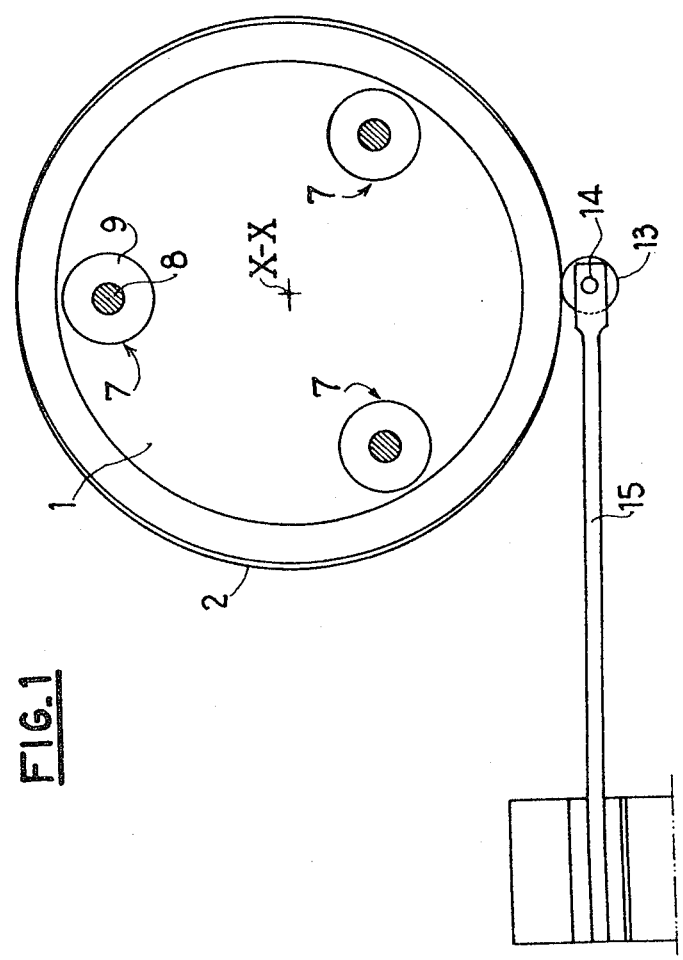
FIG. 1 is a diagrammatic view of a part of a shaping machine according to the invention, taken in section along line 1—1 of FIG. 4.

With reference to FIGS. 1 to 3, a workpiece (not shown) comprises a cylindrical surface whose axis coincides with the axis X—X of a workpiece carrying plate 1. The manner in which the workpiece is maintained so as to achieve this coaxial relationship is not critical and has not been illustrated in FIGS. 1 to 3. In particular, the workpiece may be fixed in an eccentric or overhanging position on the plate 1.

The plate 1 is formed by a planar disc of constant thickness which carries a peripheral cylindrical cam 2 whose profile deviates slightly from the circular shape in order to have an elliptical shape. Near to the periphery of the plate, there are provided three axially extending apertures 3 which are equally spaced apart about the axis X—X and are counterbored adjacent the side on which the workpiece to be shaped is placed on the plate.

A rotary spindle 4, which is connected to the output shaft of a drive unit (not shown in FIGS. 1 to 3), comprises a planar end disc 5 which is parallel to the disc 1 and provided with three axially extending apertures 6 in alignment with the apertures 3 and counterbored at the end opposed to the apertures 3.

The plate 1 is connected to the disc 5 by three elastically yieldable small pillars or struts 7, for example of steel. Each pillar has a cylindrical body portion 8 of constant diameter and is enlarged adjacent each end into a foot portion 9 defining a radially extending shoulder 10 whose diameter exceeds the diameter of the apertures 3 and 6. The pillar is extended beyond each shoulder 10 by a portion of a smooth rod 11 which has a screwthreaded end portion and whose diameter is between the diameter of the body portion 8 and the diameter of the shoulder 10.

Each rod portion is inserted without clearance in a respective aperture 3 or 6. Its smooth portion is located in this aperture and the screwthreaded portion projects into the corresponding counterbore. A nut 12 screwthreadedly engaged on this screwthreaded portion and received in the counterbore completes the fixing of the considered rod portion 11.

A cylindrical roller 13 rolls along the periphery of the cam 2. This roller is journalled on a spindle 14 which is parallel to the axis X—X and is carried adjacent one end of a flexible and elastically yieldable strip 15. The other end of the strip 15 is fixed to the frame of the machine and the effective length of the strip may be adjusted by adjusting means (not shown).

The axis Y—Y of the spindle 4 is fixed. When this spindle rotates, it drives the plate 1 in rotation through the pillars 7 so that the roller 13 rolls along the parts of variable radius of the cam 2. The ratio between the elasticities of the strip 15 and the pillars 7, which is for example of the order of 100:1, defines the distance of displacement d of the axis X—X of the plate 1, as explained in French patent No. 1 401 983 mentioned above. FIGS. 2 and 3 illustrate the maximum displacement of the axis X—X in a very exaggerated manner.

Consequently, if a rotary grinding wheel of fixed axis parallel to the axis Y—Y (not shown in FIGS. 1 to 3) engages the cylindrical surface to be shaped of the considered workpiece, this surface is ground in accordance with an elliptical profile similar to that of the cam 2 but with an eccentricity d.

Owing to the fact that the plate 1 is supported by three pillars 7, this plate moves in practice in an exactly radial direction parallel to itself without rotation or inclination of the plate relative to the spindle 4. The pillars 7 in particular ensure a uniform elasticity of the assembly in all radial directions of the plate.

The described blocking provides considerable rigidity of the fixing of the foot portions 9 and eliminates any sliding, even micrometric sliding, in this region. Further, with the aforementioned ratio between the elasticities, the radial elasticity of the plate relative to the disc 5 may be made to be free of any hysteresis and its displacement may be perfectly proportional to and colinear with the radial force F developed by the contact of the roller 13 against the periphery of the cam 2.

When it moves radially, the plate remains perfectly parallel to the starting position and consequently the surface to be ground remains exactly parallel to the axis of rotation of the spindle 4 of the machine and it is possible to obtain the desired mathematically cylindrical profile with high precision.

Figure 4:
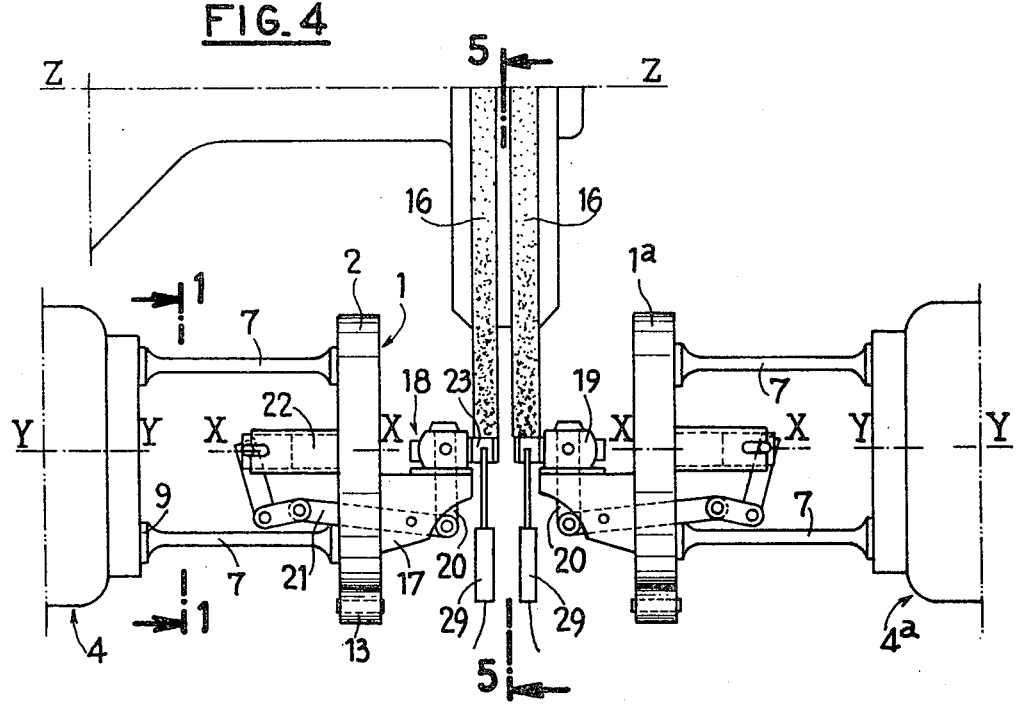
FIG. 4 diagrammatically illustrates a shaping machine according to the invention.
Figure 5:
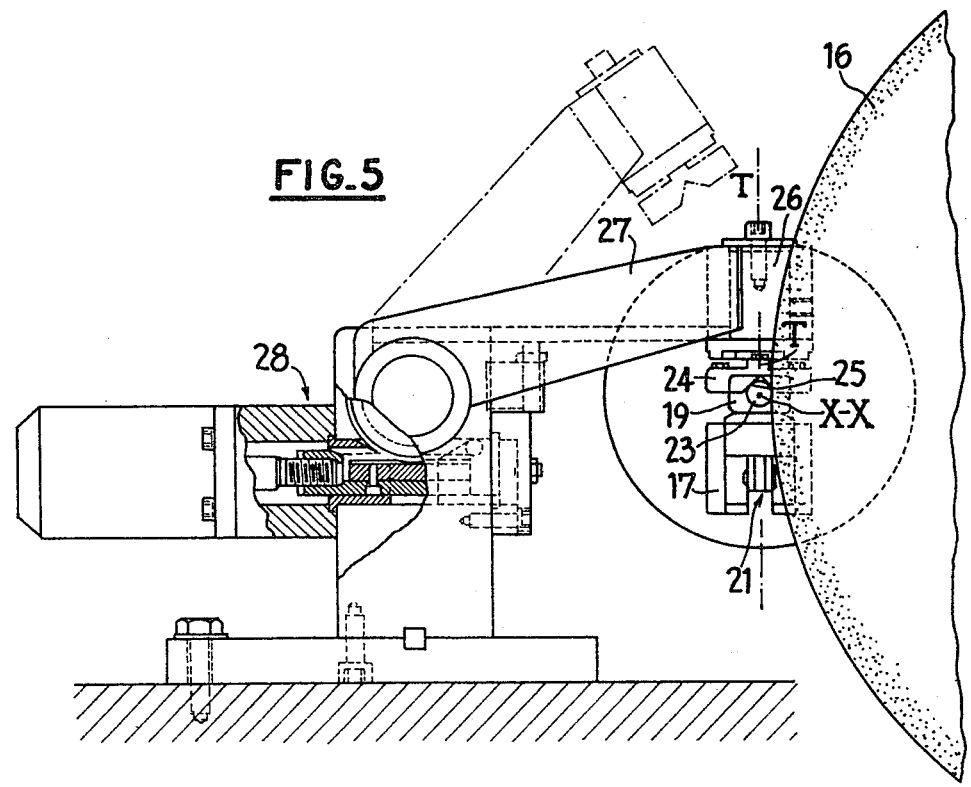
FIG. 5 is a sectional view taken along line 5—5 of FIG. 4.

FIGS. 4 and 5 illustrate the application of the invention to a double grinding machine, without centre of the trunnions of tripod elements for homokinetic joints. In this case, two spindles 4, 4a having the same axis Y—Y are provided, each spindle having however individual means for achieving a slow displacement thereof in the course of the grinding toward the axis Z—Z of a double grinding wheel 16 and a rapid return, the grinding wheels being provided with rapid feeding and return means.

Each plate 1, 1a carries a bracket 17 on which a tripod element 18 is releasably fixed by its hub 19 by means of an expansible inner clamp 20 actuated by linkage 21 and by a single-acting cylinder device 22 which are mounted on the plate but not shown in FIG. 1. The precise positioning of the tripod element 18, so that each trunnion 23 to be ground is brought is succession to a position which is perfectly coaxial to the associated plate 1, 1a is ensured by orienting means 24 (not shown in FIG. 4) comprising three radial inverted V-shaped recesses 25 which are arranged 120° apart. These means 24 are floatably mounted at the lower end of an indexing mechanism 26 carried by an upwardly withdrawable arm 27 actuated by a rack and pinion system 28. The return of each spindle 4, 4a to its starting position is initiated by an electric gauge 29 which bears against the trunnion in the course of the grinding. Suitable automatic devices control the stopping of the spindles 4, the release of the finished workpieces, the loading, the positioning and the blocking of the new workpieces, the starting up of the workpiece-carrying spindles, etcetera.

The machine shown in FIGS. 4 and 5 is identical to that described in detail in the French patent application No. 80 20 805 filed on the same day by the Applicant, apart from the elastically yieldable connection by means of three pillars between each workpiece carrying plate 1, 1a and the corresponding spindle 4, 4a.

By way of a modification, more than three pillars may be provided equally spaced apart circumferentially between each plate and its spindle, although the use of three pillars is preferred.

By means of the invention it is generally possible to achieve rapidly and cheaply a very precise shaping in automatic manufacture in mass production by means of a simple and reliable device. It is applicable in particular not only to trunnions of tripod joints but also to the trunnions of the spiders of universal joints, to the trunnions of tripod joints and to roller-carrying spindles in general. It has another advantageous application in the grinding of shaped bores receiving rolling bearings, shafts or articulated shafts.

Having now described our invention what we claim as new and desire to secure by Letters Patent is:

1. A shaping machine comprising:
a rotary spindle adapted to be rotated about an axis of rotation thereof by a motor;
a workpiece carrying plate extending perpendicular
means for maintaining a workpiece to be shaped in a position coaxial with said plate;
connection means for connecting said plate to said spindle, such that rotation of said spindle causes rotation of said plate and the workpiece to be shaped;
a cam mounted about the periphery of said plate and rotatable therewith, said cam having a shape proportional to a shape to be imparted to the workpiece by a shaping tool;
means for biasing radially said cam and said plate during rotation thereof; and
said connection means comprising a plurality of radially resiliently yieldable struts extending parallel to said rotation axis and spaced about said rotation axis, each said strut having opposite end portions rigidly fixed without relative axial displacement to said spindle and to said plate, said plurality of struts thereby forming means for fixing the axial distance between said spindle and said plate, for transmitting rotation of said spindle to said plate, and for enabling radial displacement of said plate with respect to said rotation axis of said spindle.

2. A machine as claimed in claim 1, comprising three said elastically yieldable struts evenly spaced apart about said rotation axis of said spindle.

3. A machine as claimed in claim 1, wherein said struts are fixed to said plate close to the periphery of said plate.

4. A machine as claimed in claim 1, wherein each of said struts has a body portion which has a diameter which is substantially constant, and said end portions are enlarged.

5. A machine as claimed in claim 4, wherein each of said enlarged end portions defines a shoulder having extending axially therefrom a screwthreaded rod portion.

6. A machine as claimed in claim 5, wherein each said rod portion has a diameter which is between the diameter of said body portion and the diameter of said shoulder.

7. A machine as claimed in claim 1, wherein said biasing means comprises a roller carried by an elastically yieldable means for rolling engagement with said cam.

8. A machine as claimed in claim 7, wherein said elastically yieldable means comprises a flexible strip of adjustable length.

* * * * *